United States Patent [19]

Yoshida

[11] 4,099,130

[45] Jul. 4, 1978

[54] PHASE SYNCHRONIZING CIRCUIT

[75] Inventor: Yasuharu Yoshida, Tokyo, Japan

[73] Assignee: Nippon Electric Co., Ltd., Tokyo, Japan

[21] Appl. No.: 779,878

[22] Filed: Mar. 21, 1977

[30] Foreign Application Priority Data

Mar. 22, 1976 [JP] Japan ............................... 51-31023

[51] Int. Cl.² ........................................... H03D 13/00
[52] U.S. Cl. ................................. 329/104; 329/112; 329/122
[58] Field of Search ................. 329/50, 104, 105, 112, 329/122, 124, 107, 125

[56] References Cited

U.S. PATENT DOCUMENTS

| | | | |
|---|---|---|---|
| 3,970,946 | 7/1976 | Matsuo | 329/104 |
| 4,039,961 | 8/1977 | Ishid et al. | 329/112 |

*Primary Examiner*—John Kominski
*Attorney, Agent, or Firm*—Sughrue, Rothwell, Mion, Zinn and Macpeak

[57] ABSTRACT

A phase synchronizing circuit for use in a multi-level, multi-phase, superposition-modulating signal transmission system is disclosed. The circuit includes a voltage-controlled oscillator which is responsive to a phase error signal. The output of the voltage-controlled oscillator is supplied as the reference input to a phase-detecting circuit. First and second demodulator circuits receive the output of the phase-detecting circuit and detect the superposition modulated signal. A logic circuit processes the outputs of the demodulator circuits to produce a signal representing a phase difference between first and second modulated carrier waves. Control circuitry is responsive to the output of the logic circuit for controlling at least one of the phase variation and the amplitude variation on the phase error signal.

7 Claims, 12 Drawing Figures

U.S. Patent   July 4, 1978   Sheet 1 of 4   4,099,130
FIG 1 PRIOR ART
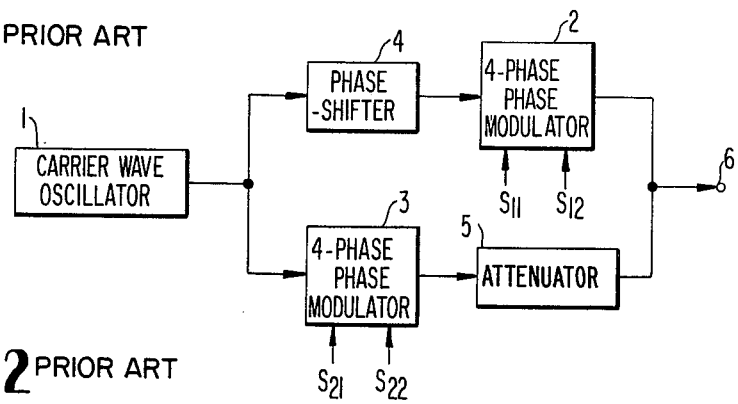
FIG 2 PRIOR ART
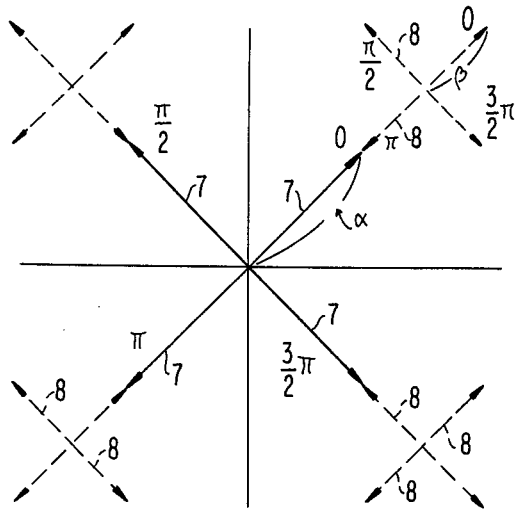
FIG 3 PRIOR ART
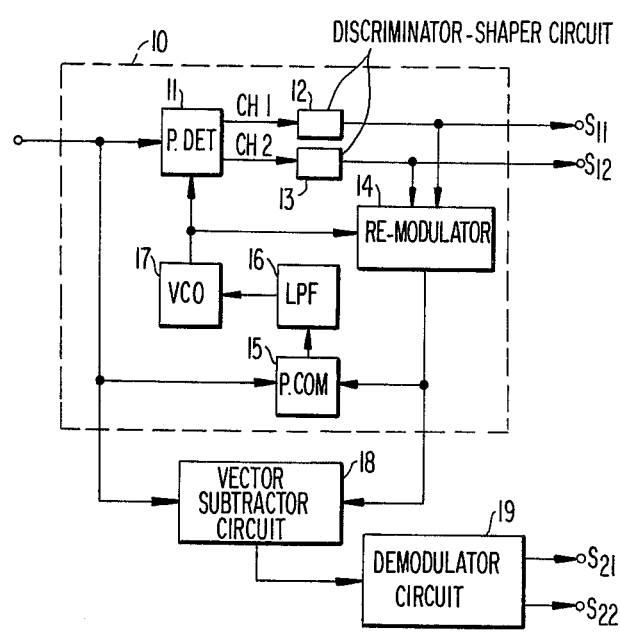
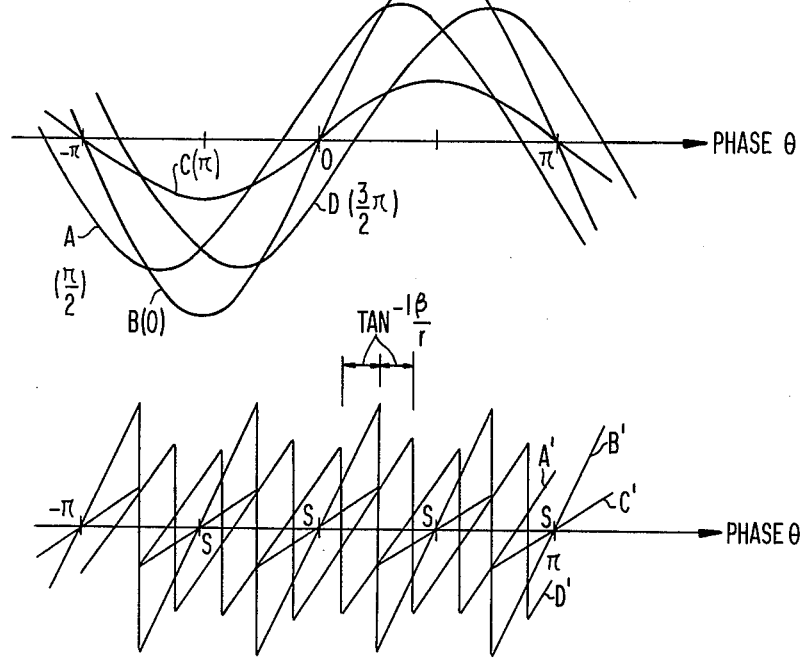
FIG 4 PRIOR ART
FIG 5 PRIOR ART

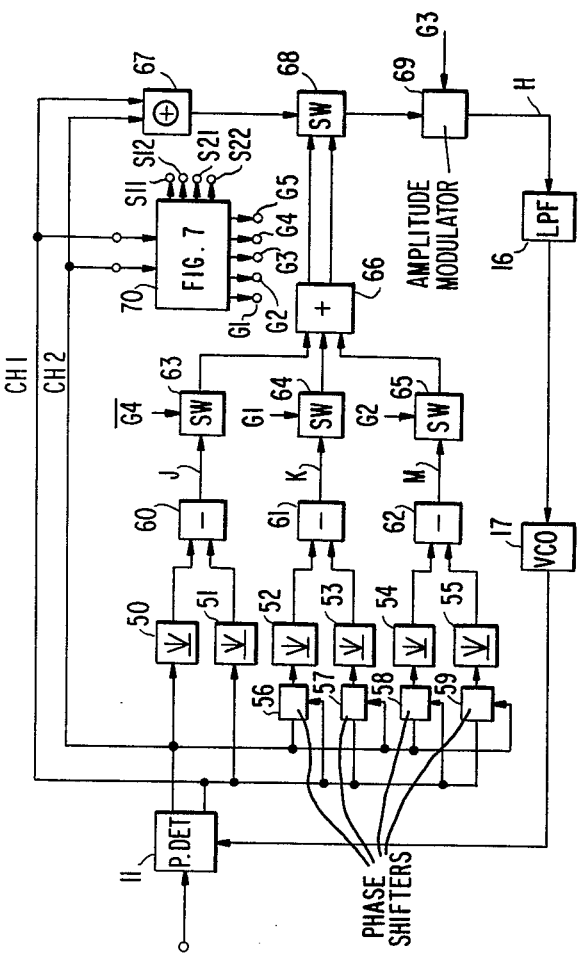
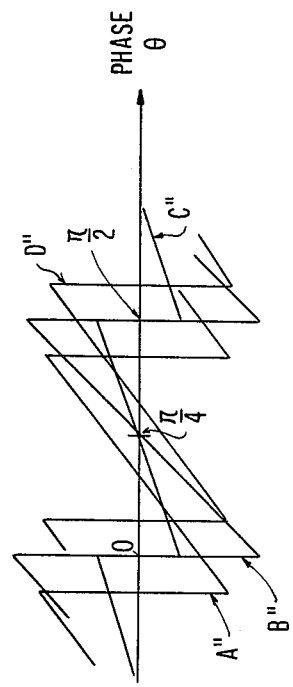
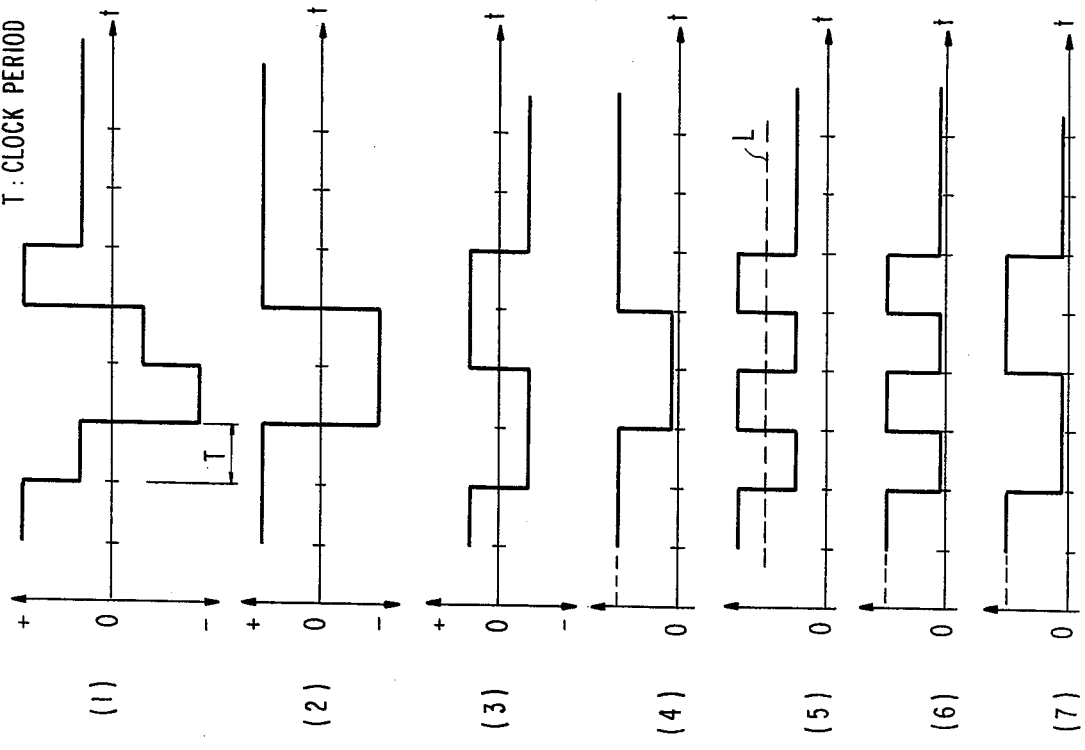

PHASE SYNCHRONIZING CIRCUIT

CROSS-REFERENCE TO RELATED APPLICATION

The subject matter of this application is related to my copending application Ser. No. 779,853, filed Mar. 21, 1977.

BACKGROUND OF THE INVENTION

The present invention relates to a phase synchronizing circuit for use in a multi-level, multi-phase, superposition-modulated signal transmission system in which the modulated carrier waves are mutually synchronized and, more particularly, to a phase synchronizing circuit of this type having a circuit for compensating the phase and amplitude variation of the phase error signal caused by the superposition-modulation.

Now that digital transmission has been in practical use, efforts have been made recently to enhance the transmission capacity of a carrier wave and also to enhance the efficiency with which the frequency band is used. One of the proposals made as a result of such efforts is the multi-level, multi-phase, superposition-modulated wave transmission system in which a first and a second modulated carrier waves are synthesized under synchronized state to constitute a composite carrier wave for transmission.

An ordinary multi-level, multi-phase, superposition-demodulator apparatus for such transmission system includes the so-called re-modulation type demodulator synchronized with the incoming transmitted carrier wave, and a vector subtractor circuit coupled to the demodulator.

The demodulator is adapted to demodulate at its first demodulator section the first modulated carrier wave contained in the modulated carrier wave. Also, the second modulated carrier wave is obtained by deriving the remodulated first modulated carrier wave from the first modulator section and subjecting it to vector subtraction. This second modulated carrier wave is demodulated at the second demodulator section similar to the aforementioned first demodulator circuit.

This demodulator circuit, that is, the so-called re-modulation type phase synchronizing circuit functions as a phase synchronizing circuit for the first modulated carrier wave component. However, since the second modulated wave component behaves as an interference wave, the reproduced carrier wave tends to be associated with jitters. This adversely affects the quality of the demodulation output.

SUMMARY OF THE INVENTION

It is therefore an object of the present invention to provide an excellent phase synchronizing circuit that eliminates the aforementioned disadvantage.

According to one feature of the present invention, there is provided a phase synchronizing circuit for use in a multi-level, multi-phase, superposition-modulated signal transmission system in which the transmission carrier wave is formed by combining a first modulated carrier wave and a second modulated carrier wave which are synchronized with each other, comprising a voltage-controlled oscillator having frequencies varying in response to a phase error signal, phase-detector means for detecting said superposition-modulated signal with respect to the output of said oscillator, a logic circuit for processing the outputs of said phase-detector means to produce a signal representing the phase difference between said first and second modulated carrier waves, and means responsive to the output of said logic circuit for controlling at least one of the phase variation and the amplitude variation in said phase error signal.

BRIEF DESCRIPTION OF THE DRAWINGS

Now the present invention will be described in more detail with reference to the accompanying drawings, in which:

FIG. 1 is a block diagram of one example of a known modulator for a 16-level superposition-modulation transmission system;

FIG. 2 is a vector diagram for the description of the modulator shown in FIG. 1;

FIG. 3 is a block diagram of one example of a known demodulator for a similar superposition-modulation transmission system;

FIG. 4 shows output beat waveforms for the description of a phase comparator circuit employed in the demodulator of FIG. 3 assuming that the remodulator therein is interrupted;

FIG. 5 shows output waveforms for the phase comparator circuit employed in the demodulator of FIG. 3, FIGS. 6, 9 and 11 show preferred embodiments of the phase synchronizing circuit according to the present invention, FIG. 8 shows waveforms at various portions in the A–D converter in FIG. 7, FIG. 10 shows a waveform at point H in FIG. 9.

Referring now to the drawings showing one example of the parallel-connection type modulator for the 16-level superposition-modulation system, reference numeral 1 designates a carrier wave oscillator; 2, a first 4-phase phase modulator; 3, a second 4-phase phase modulator; 4, a phase shifter; 5, an attenuator; and 6, an output terminal. In the phase modulator 2, a carrier wave is modulated by two series of first digital signals $S_{11}$ and $S_{12}$, the modulated signal is hereinafter called a first modulated signal or a first modulated carrier wave, and a demodulated signal for this modulated signal is called a first demodulated signal. Likewise, in the modulator 3, a carrier wave is modulated by two series of second digital signals $S_{21}$ and $S_{22}$, the modulated signal is hereinafter called a second modulated signal or a second modulated wave, and a demodulated signal for this modulated signal is called a second demodulated signal. The phase shifter 4 is provided for the purpose of adjusting the phases of the first and second modulated signals, and here it is assumed that they are adjusted to be in-phase. The attenuator 5 is provided for the purpose of adjusting the level difference between the first and second modulated signals, and here it is assumed that the first modulated signal level is equal to $\alpha$ and the second modulated signal level is equal to $\beta$. FIG. 2 is a vector diagram of the modulated signals at the output terminal 6 (FIG. 1). Reference numeral 7 designates a first modulated signal, numeral 8 designates a second modulated signal, and a combined vector for these signals appears at the output terminal 6.

Figure 6:
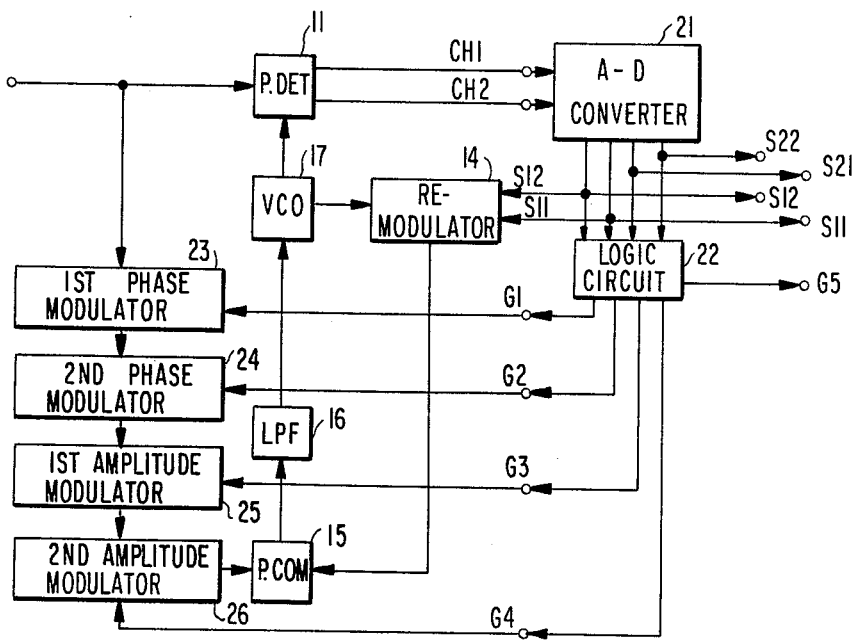

A conventional demodulator device for demodulating the thus superposition-modulated signal is shown in FIG. 3. In this figure, reference numeral 10 designates a 4-phase phase demodulator circuit employing a well-known remodulation-comparison type phase synchronizing circuit; 18, a vector subtractor circuit; and 19, a demodulator circuit similar to the demodulator circuit 10. The demodulator circuit, that is, phase synchronizing circuit 10 is composed of a 4-phase phase detector (P. DET) 11, discriminator-shaper circuits 12 and 13, a remodulator 14, a phase comparator circuit (P. COM) 15, a low-pass filter (LPF) 16 and a voltage-controlled oscillator (VCO) 17. Since the operation of this device is well-known, it will be explained only briefly. In the discriminator-shaper circuits 12 and 13, the first demodulated signal $S_{11}$ and $S_{12}$ is discriminated and reproduced. On the other hand, the second demodulated signal is obtained in the following manner. In the remodulator 14, the reproduced carrier wave from the voltage-controlled oscillator 17 is modulated by the first demodulated signals $S_{11}$ and $S_{12}$ to provide the first modulated carrier wave. In the vector subtractor 18 (a directional coupler being available therefor), the first modulated carrier wave of the remodulator circuit 14 is subtracted from the input superposition-modulated carrier wave branched to provide only the second modulated carrier wave. The second demodulated signals $S_{21}$ and $S_{22}$ can be obtained by demodulating the second modulated carrier wave in the demodulator circuit 19.

However, in the case that a superposition-modulated carrier wave is applied to the input of this phase synchronizing circuit 10, this phase synchronizing circuit operates as a phase synchronizing circuit for the first modulated wave component, but the second modulated wave is deemed as an undesired wave causing an interference. This operation mode will be described with reference to FIGS. 4 and 5. FIG. 4 shows output beat waveforms of the phase comparator circuit 15 with the remodulator circuit 14 interrupted, in which the abscissa represents a phase difference between the input signal at the input of the phase comparator circuit 15 and the output of the VCO 17. In FIG. 4, a beat waveform A represents the case where the phase difference between the first and second modulated waves is equal to $\pi/2$, a waveform B represents the case of in-phase, a waveform C represents the case of opposite phase, and a waveform D represents the case of $3/2\pi$. In this way, the beat signal at the output of the phase comparator circuit 15 is subjected to phase variation of $Q = \tan^{-1} \beta/\alpha$ and a level variation of 20 log $(\alpha + \beta/\alpha - \beta)$ (MAX) depending upon the phase relation between the first modulated wave and the second modulated wave. Consequently, starting from the state shown in FIG. 4, when the remodulator 14 is operated and a 4-phase phase error signal is obtained at the output of the phase comparator 15, the output waveforms take the forms shown in FIG. 5 which are directly subjected to the aforementioned phase variation and level variation. Here, point S represents a phase stable point.

As described above, in the phase synchronizing circuit 10 for the superposition-modulated wave, the phase error signal is directly affected by the phase and amplitude variations caused by the superposition-modulation system. Therefore, even if jitter components are suppressed by the low-pass filter 16, the phase error signal would contain a large amount of jitter components, making it impossible to obtain a reference carrier wave having an excellent carrier-to-noise ratio.

According to the present invention, there is provided an improved phase synchronizing circuit free of those disadvantages in which a phase variation component or an amplitude variation component contained in a phase error signal can be sufficiently compensated.

FIG. 6 shows one preferred embodiment of the remodulation type phase synchronizing circuit according to the present invention. This phase synchronizing circuit can be deemed also as a demodulator device for the superposition modulated carrier wave. In this figure, reference numeral 21 designates an A–D converter circuit; 22, a logic circuit; 23, a first phase modulator; 24, a second phase modulator; 25, a first amplitude modulator; and 26, a second amplitude modulator. Component elements designated by reference numerals 11 and 14 to 17, respectively have the same functions as those represented by like reference numerals in FIG. 3. The first phase modulator 23 is for giving a phase shift of $+\tan^{-1} \beta/\alpha$, which is actuated by a drive signal G1 issued from the logic circuit 22 when the phase difference between the first modulated wave and the second modulated wave is equal to $3/2\pi$. By this operation, the phase error signal D' in FIG. 5 is brought to phase coincidence with the phase error signal C'. The second phase modulator 24 is for giving a phase shift of $-\tan^{-1} \beta/\alpha$, which is actuated by a drive signal G2 when the phase difference between the first modulated wave and the second modulated wave is equal to $\pi/2$. By this operation, the phase error signal A' in FIG. 5 is brought to phase coincidence with the phase error signal C'. The first amplitude modulator 25 is for giving an attenuation of 20 log $$\frac{\sqrt{\alpha^2 + \beta^2}}{\alpha - \beta} \, dB,$$

which is actuated by a drive signal G3 when the phase difference between the first modulated wave and second modulated wave is equal to $\pi/2$ or $3/2\pi$. By this operation, the amplitude values of the phase error signals A' and D' in FIG. 5 are brought to coincidence with that of the phase error signal C'. In addition, the second amplitude modulator 26 is for giving an attenuation of 20 log $(\alpha + \beta/\alpha - \beta)$ dB, which is actuated by a drive signal G4 when the phase difference between the first modulated wave and the second modulated wave is equal to zero. By this operation, the amplitude value of the phase error signal B' in FIG. 5 is made to coincide with that of the phase error signal C'. Owing to the above-described operations, all the phase error signals A' to D' in FIG. 5 coincide in phase values and amplitude values with each other, so that the amplitude variation as well as the phase variation caused by the superposition-modulation can be compensated. The drive signals G1 to G4 are generated by the A–D converter 21 and the logic circuit 22.

Figure 7:
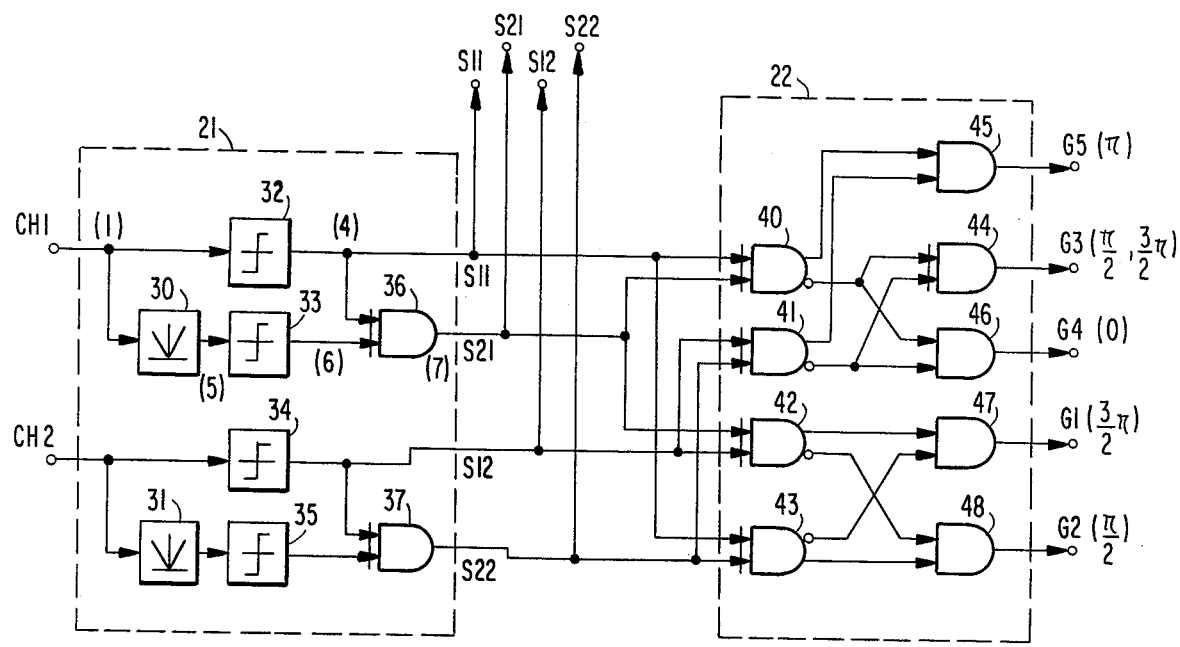
FIG. 7 is a more detailed circuit diagram of one example of an A–D converter and a logic circuit employed in the embodiment of FIG. 6.

FIG. 7 shows a more detailed circuit arrangement of the A–D converter circuit 21 and the logic circuit 22. The A–D converter circuit 21 is for reproducing a first demodulated signal and a second demodulated signal from the superposition-demodulated signal, and is composed of squaring circuits constituted by full-wave rectifier circuits 30 and 31, discriminator-shaper circuits 32 to 35, and Exclusive-OR circuits 36 and 37. The operation of this A–D converter circuit 21 will be explained with reference to FIG. 8. The output signal from the 4-phase detector circuit 11 in FIG. 6 is a signal demodulated in the form such that the second modulated signal is superposed on the first modulated signal, and so, it is a 4-level demodulated signal. Assuming that the demodulated signal at the channel CH1 has a pattern series as shown by waveform 1 in FIG. 8, then the signal formed by superposing the second demodulated signal as shown by waveform 3 on the first demodulated signal as shown by waveform 2. Accordingly, it is only necessary to separate these two signals by any appropriate means. At first, if the waveform 1 is discriminated with respect to a voltage level of 0 in the discriminator-shaper circuit 32, then the waveform 4 can be obtained, which coincides with the waveform 2 and provides a first demodulated signal $S_{11}$. On the other hand, if the waveform 1 is subjected to full-wave rectification in the full-wave rectifier circuit 30, then a waveform 5 can be obtained. Further, if the waveform 5 is discriminated with respect to a voltage level of L in the discriminator-shaper circuit 33, then a waveform 6 can be obtained. Referring to the waveform 6, although this waveform contains a second demodulated signal component, its polarity is reversed when the first demodulated signal is at a negative level (assumed as 0 level). Therefore if an Exclusive-OR function of the waveforms 6 and 4 is obtained in the Exclusive-OR circuit 36, then a waveform 7 is obtained as its complementary output. This waveform 7 coincides with the waveform 3, and it can serve as a second demodulator signal $S_{21}$. By the above-mentioned operations, a first demodulated signal and a second demodulated signal can be obtained. With respect to the channel CH2, the operations are the same as those described above. Through the above-mentioned processes, first demodulated signal $S_{11}$ and $S_{12}$ and second demodulated signal $S_{21}$ and $S_{22}$ can be reproduced.

In the logic circuit 22 shown in FIG. 7, the phase relationship is determined between the first modulated signal and the second modulated signal, on the basis of the demodulated signals $S_{11}$, $S_{12}$, $S_{21}$ and $S_{22}$. This logic circuit 22 is composed of Exclusive OR circuits 40 to 44 and AND circuits 45 to 48. It is to be noted here that between the phase of the first modulated wave and the signal $S_{11}$, $S_{12}$ and between the phase of the second modulated wave and the signal $S_{21}$, $S_{22}$, respectively, there exist the relations represented by Table I*a*. Accordingly, if the relations represented by Table I*a* are used, the phase relation between the first modulated wave and the second modulated wave can be determined. Table I*b* shows the relations between the signals $S_{11}$, $S_{12}$ and $S_{21}$, $S_{22}$ in the case where the phase difference between the first modulated wave and the second modulated wave is zero, Table I*c* shows the same in the case where the phase difference is $\pi$, Table I*d* shows the same in the case where the difference is $\pi/2$, and Table I*e* shows the same in the case where the difference is $3/2\pi$. In accordance with the conditions given by Tables I*b* – I*e*, the decision circuit 22 can be formed in the following manner. The Exclusive-OR function of the signals $S_{11}$ and $S_{21}$ is obtained in an Exclusive-OR circuit 40. Also the Exclusive-OR function of the signals $S_{12}$ and $S_{22}$ is obtained in an Exclusive-OR circuit 41.

Table I

| | a | | | | |
|---|---|---|---|---|---|
| | 1st Modulated Wave | | | 2nd Modulated Wave | |
| Phase | $S_{11}$ | $S_{12}$ | Phase | $S_{21}$ | $S_{22}$ |
| 0 | 0 | 0 | 0 | 0 | 0 |
| $\frac{\pi}{2}$ | 0 | 1 | $\frac{\pi}{2}$ | 0 | 1 |
| $\pi$ | 1 | 1 | $\pi$ | 1 | 1 |
| $\frac{3\pi}{2}$ | 1 | 0 | $\frac{3\pi}{2}$ | 1 | 0 |

Table I-continued

| | b (0) | | | | c ($\pi$) | | | |
|---|---|---|---|---|---|---|---|---|
| | $S_{11}$ | $S_{12}$ | $S_{21}$ | $S_{22}$ | $S_{11}$ | $S_{12}$ | $S_{21}$ | $S_{22}$ |
| 1 | 0 | 0 | 0 | 0 | 1 | 0 | 0 | 1 | 1 |
| 2 | 0 | 1 | 0 | 1 | 2 | 0 | 1 | 1 | 0 |
| 3 | 1 | 1 | 1 | 1 | 3 | 1 | 1 | 0 | 0 |
| 4 | 1 | 0 | 1 | 0 | 4 | 11 | 0 | 0 | 1 |

| | d ($\frac{\pi}{2}$) | | | | e ($\frac{3}{2}\pi$) | | | |
|---|---|---|---|---|---|---|---|---|
| | $S_{11}$ | $S_{12}$ | $S_{21}$ | $S_{22}$ | $S_{11}$ | $S_{12}$ | $S_{21}$ | $S_{22}$ |
| 1 | 0 | 0 | 0 | 1 | 1 | 0 | 0 | 1 | 0 |
| 2 | 0 | 1 | 1 | 1 | 2 | 0 | 1 | 0 | 0 |
| 3 | 1 | 1 | 1 | 0 | 3 | 1 | 1 | 0 | 1 |
| 4 | 1 | 0 | 0 | 0 | 4 | 1 | 0 | 1 | 1 |

Further, if the Exclusive-OR function of the complementary outputs of the circuit 40 and the circuit 41 is obtained in the Exclusive-OR circuit 44, then a signal G3 representing a phase difference of $\pi/2$ or $3/2\pi$ can be obtained at the output of the circuit 44, and if a logic product of the complementary outputs of the circuits 40 and 41 is taken by the AND circuit 46, then a signal G4 representing an in-phase relationship is obtained at the output of the circuit 46. In addition, the Exclusive-OR function of the signals $S_{12}$ and $S_{21}$ is obtained in the Exclusive-OR circuit 42, the Exclusive-OR function of the signals $S_{11}$ and $S_{22}$ is obtained in the Exclusive-OR circuit 43, and a logic product of an output of the circuit 42 and a complementary output of the circuit 43 is taken by the AND circuit 47. Then at the output of this circuit is obtained a signal G1 representing a phase difference of $3/2\pi$. Furthermore, if a logic product of a complementary output of the circuit 42 and an output of the circuit 43 is taken by the AND circuit 48, then a signal G2 representing a phase difference of $\pi/2$ can be obtained at the output of the circuit 48. Still further, if the logic product of the outputs of the circuits 40 and 41 is taken by the AND circuit 45, then a signal G5 representing a phase difference of $\pi$ can be obtained at the output of the circuit 45. Through the above-mentioned operations, signals G1 to G5 can be derived from the logic circuit 22.

When the phase modulators 23 and 24 and the amplitude modulators 25 and 26 are driven by the thus obtained signals G1 to G4, respectively, the phase variation as well as the amplitude variation which are generated in the phase error signal due to superposition modulation as described above, can be compensated. With regard to the signal G5, description will be given later.

FIG. 9 shows another preferred embodiment of the present invention as applied to a phase synchronizing circuit employing a base-band processing. In this figure, reference numerals 50 to 55 squaring circuits constituted by full-wave rectifier circuits; 56 to 59, phase shifters; 60 to 62, subtractors; 63 to 65 and 68, analog switches (SW); 66, an adder; 67, an Exclusive-OR circuit; 69, an amplitude modulator; and 70, the entire circuit illustrated in FIG. 7. In addition, numerals 11, 16 and 17 designate the circuits represented by like numerals in FIG. 6. The heretofore known phase synchronizing circuit is composed of the circuits 11, 16, 17, 50, 51, 60, 67 and 68. In connection to this known apparatus, reference should be made to U.S. Pat. No. 3,983,499 issued Sept. 28, 1976. In this heretofore known synchronizing circuit, the phase error signal for the superposition-modulated wave is as shown in FIG. 10, in which it is subjected to a phase variation as well as an amplitude variation similarly to the case of FIG. 5. In order to compensate for these variations, the circuit shown in FIG. 9 can be employed. In FIG. 9, the circuit arrangement is constructed in such manner that a signal appearing at point K may be phase-shifted by $+\tan^{-1}\beta/\alpha$ with respect to a signal appearing at point J, while a signal appearing at point M may be phase-shifted by $-\tan^{-1}\beta/\alpha$ with respect to the signal at point J. Therefore, in the case where the phase difference between the first modulated wave and the second modulated wave is equal to $\pi/2$, an output at the point J is switched off by the analog switch 63 in response to an inverted signal G4 for the output signal G4, while an output signal at the point M is switched on by the analog switch 65 in response to the signal G2. Through these operations, phase error signal A″ in FIG. 10 is brought to phase coincidence with a phase error signal C″. On the other hand, in the case where the phase difference between the first modulated wave and the second modulated wave is equal to $3/2\pi$, the output at the point J is switched off by the analog switch 63 in response to the inverted signal G4 for the signal G4, while the output signal at the point K is switched on by the analog switch 64 in response to the signal G1. Through these operations, a phase error signal D″ in FIG. 10 is brought to phase coincidence with the phase error signal C″. In other words, if the output at the point J is selected when the phase difference between the first modulated wave and the second modulated wave is equal to 0 or the output at the point M is selected when the phase difference is equal to $\pi/2$, and the output at the point K is selected when the phase difference is equal to $3/2\pi$, and if these signals are added together by the adder 66 and the sum signal is used as a phase error signal (a double frequency-multiplied signal), then all the phase error signals (4-fold frequency-multiplied signals) at the point H would coincide in phase with the phase error signal C″ in FIG. 10. While the phase variation is compensated in the above-described manner, the amplitude variation can be compensated in the following way. In the case where the phase difference between the first modulated wave and the second modulated wave is equal to zero, the amplitude modulator 69 is actuated by the drive signal G3. The circuit 69 gives an attenuation of $20 \log \alpha + \beta/\alpha - \beta$, and through this operation the amplitude value of the phase error signal B″ in FIG. 10 is brought to amplitude coincidence with the error signal C″. In addition, if the outputs at the points K and M are adjusted so that the amplitude value of the phase error signal at the point H caused by the outputs at the points K and M may coincide with the amplitude value of the phase error signal C″ in FIG. 10, then the amplitude values of the phase error signals A″ and D″ in FIG. 10 will coincide with the amplitude value of the phase error signal C″. Through the above-mentioned operations, the amplitude variation can be compensated.

Nextly, a circuit for phase-shifting the output at the point K by $+\tan^{-1}\beta/\alpha$ with respect to the output at the point J will be explained. The phase shift of $+\tan^{-1}\beta/\alpha$ can be achieved by the phase shifters 56 and 57. The outputs CH1 and CH2 of the 4-phase phase detector 11 are orthogonal to each other, so that by varying the amplitude values of the respective signals and adding or subtracting them to or from each other, any arbitrary phase condition can be attained. For instance, in the case where a phase difference of $+\tan^{-1}\beta/\alpha$ is desired, representing CH1 by $\cos \theta$ and CH2 by $\sin \theta$, then since cos $$(\theta + \tan^{-1}\frac{\beta}{\alpha})$$

is equal to $$\frac{1}{\sqrt{\alpha^2 + \beta^2}} (\alpha \cos \theta - \beta \sin \theta),$$

it can be achieved by subtracting CH2 from CH1 at a ratio of $\beta:\alpha$, respectively. Or else, since $\sin (\theta + \tan^{-1} \beta/\alpha)$ is equal to $$\frac{1}{\sqrt{\alpha^2 + \beta^2}} (\alpha \sin \theta + \beta \cos \theta),$$

it can be achieved by adding CH1 and CH2 at a ratio of $\beta:\alpha$, respectively. With respect to the phase shifters 58 and 59 also, similar operations are performed.

As described above, the phase variation and amplitude variation caused by the superposition-modulation can be compensated even in the embodiment of the present invention illustrated in FIG. 9 as applied to a phase synchronizing circuit employing the signal processing in the base-band frequency region. With regard to the method for compensating the phase variation, in a phase synchronizing circuit employing a base-band processing it is achieved by means of arithmetic circuits and analog switches, while in a phase synchronizing circuit employing a carrier band processing it is achieved by means of phase modulators.

The preferred embodiments illustrated in FIGS. 6 and 9 are circuits for completely compensating the phase and amplitude variation components contained in the phase error signal. However, since the jitter of a phase error signal is more largely affected by the phase variation component than by the amplitude variation component, the jitter component of the phase error signal can be reduced to a sufficiently small value in comparison to the heretofore known circuit, even if the amplitude modulators 25, 26 and 69 should be removed. Therefore, the amplitude modulator is not an essentially necessary element for practicing the present invention.

The phase variation contained in the phase error signal arises when the phase difference between the first and the second modulated waves is equal to $\pi/2$ or $3/2\pi$, and in the embodiments illustrated in FIGS. 6 and 9 phase compensation at that time is achieved. However, there is another approach, in which the voltage-controlled oscillator 17 is controlled by the phase error signal representing that the phase difference between the first and the second modulated waves is equal 0 or $\pi$. However, it is not responsive to the phase error signal representing the phase difference of $\pi/2$ or $3/2\pi$. This approach applied to the embodiment of FIG. 3 is that a switch is inserted between the phase comparator 15 and the low-pass filter 16 and is turned off by the signal G3 shown in FIG. 7.

According to this approach, too, the jitter component of the phase error signal can be reduced in comparison to the heretofore known circuit.

Figure 11:
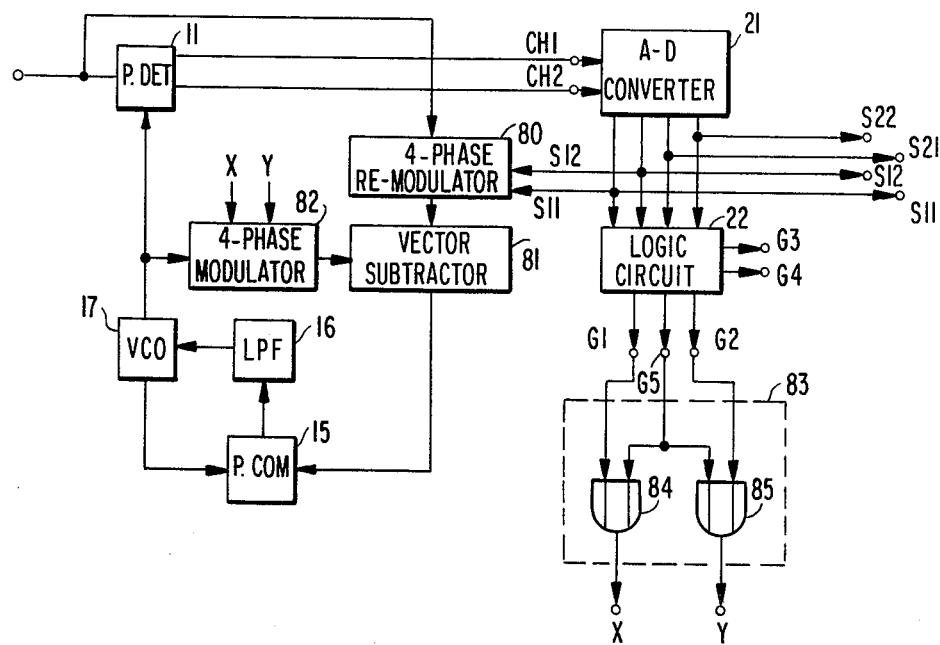

FIG. 11 shows still another embodiment of the present invention as applied to a reverse modulation system, in which reference numeral 80 designates a 4-phase re-modulator, numeral 81 designates a vector subtractor, numeral 82 designates a 4-phase modulator, and numeral 83 designates a logic circuit. The operation of this circuit arrangement will be described hereunder.

In the re-modulator 80 (which differs from the re-modulator 14 shown in FIG. 3 in function), the input superposition-modulated carrier wave is reversely modulated by the first demodulated signals $S_{11}$ and $S_{12}$ to obtain the second modulated carrier wave.

Figure 12:
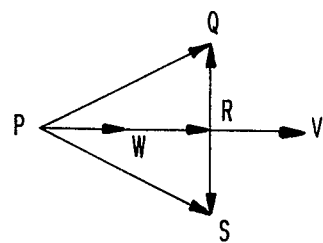
FIG. 12 is a vector diagram for explaining the operation of the circuit shown in FIG. 11.

The carrier wave derived by the re-modulator 80 is represented as shown in FIG. 12. A vector $\vec{PQ}$ represents the case where the phase difference between the first modulated wave and the second modulated wave is equal to $\pi/2$, and an angle $\angle QPR$ is represented by $\tan^{-1}\beta/\alpha$ as explained above. Likewise, in case that the phase difference is equal to $3/2\pi$, it is represented by a vector $\vec{PS}$ and an angle $\angle RPS$ is represented by $\tan^{-1}\beta/\alpha$. In addition, a vector $\vec{PW}$ has a phase difference of $\pi$, while a vector $\vec{PV}$ has a phase difference of 0. To compensate for the vector variation, the 4-phase modulator 82 and the vector subtractor circuit 81 are employed. In the modulator 82, the carrier wave supplied from the oscillator 17 is modulated by the control signals X and Y to provide the signal having the vectors $\vec{PQ}$, $\vec{RV}$, $\vec{RS}$ and $\vec{RW}$ shown in FIG. 12. Accordingly, if the output vector of the 4-phase modulator 82 is controlled in accordance with the output vector of the re-modulator 80 as shown in Table IIa, and if they are subjected to subtraction in the vector subtractor 81, then at the output of the subtractor 81 there is obtained a constant output represented by a vector $\vec{PR}$. It is to be noted that the control signals X and Y for the 4-phase phase modulator 82 are only required to satisfy the condition as shown in Table IIb. Here it is to be noted that the circuit 82 is assumed to be of Gray type (or parallel type). The Gray type modulator is disclosed in FIG. 2.4 of an article published by S. Yokoyama et al., in *NEC Research and Development*, No. 36, Jan. 1975, pp. 21 to 31, entitled "The Performance and the Features of the 4-Level PSK MODEM for an Ultralarge TDMA System." Accordingly, the control signals X and Y can be obtained at the output of the circuit 83 which is constructed of OR circuits 84 and 85 by making use of the output signals G1, G2 and G5 from the logic circuit 22. This circuit 83 could be considered to be included in the logic circuit 22.

Table II

| State | a Phase difference between first modulated wave and second modulated wave | Output vector of circuit 80 | Output vector of circuit 82 | Modulation phase of circuit 82 | b Modulation phase | X | Y |
|---|---|---|---|---|---|---|---|
| 1 | 0 | $\vec{PV}$ | $\vec{RV}$ | 0 | 0 | 0 | 0 |
| 2 | $\frac{\pi}{2}$ | $\vec{PQ}$ | $\vec{RQ}$ | $\frac{\pi}{2}$ | $\frac{\pi}{2}$ | 0 | 1 |
| 3 | $\pi$ | $\vec{PW}$ | $\vec{RW}$ | $\pi$ | $\pi$ | 1 | 1 |
| 4 | $\frac{3}{2}\pi$ | $\vec{PS}$ | $\vec{RS}$ | $\frac{3}{2}\pi$ | $\frac{3}{2}\pi$ | 1 | 0 |

As will be apparent from the above description, it is necessary to know the phase difference between the first modulated wave and the second modulated wave by whatever means. That is, an essentially necessary element for practicing the present invention is a logic circuit for determining the phase difference between the first modulated wave and the second modulated wave.

In the phase synchronizing circuits of the present invention, the 16-level superposition modulated wave is employed as an input wave. The phase sychronizing circuit capable of receiving IN(>16)-level superposition modulated wave may be arranged in the same manner described above.

The preferred embodiments illustrated in FIGS. 6, 9 and 11 also provide means for demodulating the second modulated signal. Therefore, if this demodulating means is employed, the circuit for demodulating the second modulated wave as used in the prior art apparatus such as, for example, the demodulator circuit 19 in FIG. 3, becomes unnecessary, and so, there is an advantage that the number of the component units can be reduced.

What is claimed is:

1. A phase synchronizing circuit for use in a multi-level, multi-phase, superposition-modulated carrier wave transmission system in which the carrier wave for transmission is formed by combining a first modulated carrier wave and a second modulated carrier wave synchronized with each other comprising
   a voltage-controlled oscillator having frequencies varying in response to a phase error signal,
   phase-detector means for detecting said superposition-modulated wave carrier by means of the output of said oscillator,
   a logic circuit for processing the outputs of said phase-detector means to produce a signal representing a phase difference between said first and second modulated carrier waves, and
   means responsive to the output of said logic circuit for controlling at least one of the phase variation and the amplitude variation in said phase error signal.

2. A phase synchronizing circuit as recited in claim 1 wherein said phase detector means comprises
   a phase-detector circuit for detecting a superposition-modulated carrier wave,
   a first demodulator circuit for discriminating the output of said phase-detector circuit to reproduce a first demodulated signal corresponding to said first modulated carrier wave, and
   a second demodulator circuit including squaring means for squaring the output of said phase-detector circuit, discriminator-shaper means for discriminating the output of said squaring means with respect to a given level and logic means for obtaining the Exclusive-OR function of the output of said first demodulator circuit and the output of said discriminator-shaper means, whereby a second demodulated signal corresponding to said second modulated carrier wave is reproduced.

3. A phase synchronizing circuit as recited in claim 1 wherein said means responsive to the output of said logic circuit comprises
   at least one phase modulator connected to receive the input signal to said phase-detector means and phase modulating said input signal in response to the output of said logic circuit,
   re-modulator connected to receive the outputs of said phase-detector means and said voltage-controlled oscillator to produce a re-modulated signal, and
   phase comparing means receiving the phase modulated input signal and the re-modulated signal for producing said phase error signal.

4. A phase synchronizing circuit as recited in claim 3 wherein said means responsive to the output of said logic circuit further comprises at least one amplitude modulator connected between said at least one phase modulator and said phase comparing means for amplitude modulating the phase modulated input signal in response to the output of said logic circuit.

5. A phase synchronising circuit as recited in claim 2 wherein said means responsive to the output of said logic circuit comprises phase shifting means connected to the output of said phase-detector circuit for phase shifting said detected superposition-modulated carrier wave, second squaring means for squaring the output of said phase-detector circuit, third squaring means for squaring the output of said phase shifting means, and adding means responsive to said logic circuit for combining the outputs of said second and third squaring means for producing said phase error signal.

6. A phase synchronizing circuit as recited in claim 5 wherein said means responsive to the output of said logic circuit further comprises an amplitude modulator connected to the output of said adding means and responsive to said logic circuit for amplitude modulating said phase error signal.

7. A phase synchronizing circuit as recited in claim 1 wherein said means responsive to the output of said logic circuit comprises a re-modulator connected to receive the output of said phase-detector means and the superposition modulated carrier wave to produce said second modulated carrier wave, a phase modulator connected to receive the outputs of said logic circuit and said voltage-controlled oscillator to produce a phase modulated carrier wave, a vector subtractor connected to said re-modulator and said phase modulator for producing a difference carrier wave, and phase comparing means receiving the difference carrier wave and the output of said voltage-controlled oscillator for producing said phase error signal.

* * * * *